United States Patent
Kress et al.

(10) Patent No.: US 6,220,798 B1
(45) Date of Patent: Apr. 24, 2001

(54) TOOL FOR MACHINING DRILL HOLE SURFACES

(75) Inventors: Dieter Kress, Aalen; Hans W. Beck, Sinsheim, both of (DE)

(73) Assignees: Mapal, Fabrik für Präzisions-werkzeuge; Dr. Kress KG, both of (DE)

( * ) Notice: Subject to any disclaimer, the term of this patent is extended or adjusted under 35 U.S.C. 154(b) by 0 days.

(21) Appl. No.: 09/308,893

(22) PCT Filed: Nov. 28, 1997

(86) PCT No.: PCT/EP97/06643

§ 371 Date: Jul. 16, 1999

§ 102(e) Date: Jul. 16, 1999

(87) PCT Pub. No.: WO98/23404

PCT Pub. Date: Jun. 4, 1998

(30) Foreign Application Priority Data

Nov. 29, 1996 (DE) .............................................. 196 49 568

(51) Int. Cl.⁷ ................................................. B23B 29/034
(52) U.S. Cl. .................................. 408/147; 82/1.2; 82/1.4
(58) Field of Search ................................ 408/4, 130, 146, 408/147, 148, 141; 82/1.2, 1.4

(56) References Cited

U.S. PATENT DOCUMENTS

| | | | |
|---|---|---|---|
| 4,102,534 | * 7/1978 | Benedict et al. | 173/137 |
| 4,310,055 | * 1/1982 | Wanner et al. | 173/118 |
| 4,476,941 | * 10/1984 | Buck et al. | 173/117 |
| 4,657,088 | * 4/1987 | Brossmann et al. | 173/13 |
| 4,770,569 | * 9/1988 | Ooki et al. | 408/17 |
| 4,789,280 | 12/1988 | Dobat . | |
| 4,815,899 | * 3/1989 | Regan | 408/141 |

FOREIGN PATENT DOCUMENTS

| | | |
|---|---|---|
| 8907768 | 10/1989 | (DE) . |
| 4125106 | 2/1993 | (DE) . |
| 4413955 | 10/1994 | (DE) . |
| 195 19 639 | 1/1996 | (DE) . |
| 196 05 156 | 9/1996 | (DE) . |
| 195 09 524 | 10/1996 | (DE) . |
| 2383738 | 10/1978 | (FR) . |
| 2223431 | * 8/1988 | (GB) . |
| 1-171773 | * 1/1989 | (JP) . |

\* cited by examiner

*Primary Examiner*—Steven C. Bishop
(74) *Attorney, Agent, or Firm*—Ostrolenk, Faber, Gerb & Soffen, LLP

(57) ABSTRACT

A tool for the machining of workpiece surfaces, especially of drilled-hole surfaces, has at least two parts which are displaceable relative to each other. The tool for the machining of the workpiece surfaces is rotatable and includes at least one control member (19) which is displaceable relative to the tool (1) substantially perpendicularly to the axis of rotation (9) of the tool. The control member, preferably from a preset threshold speed of rotation, effects a movement of one part (5) relative to the other (3).

18 Claims, 4 Drawing Sheets

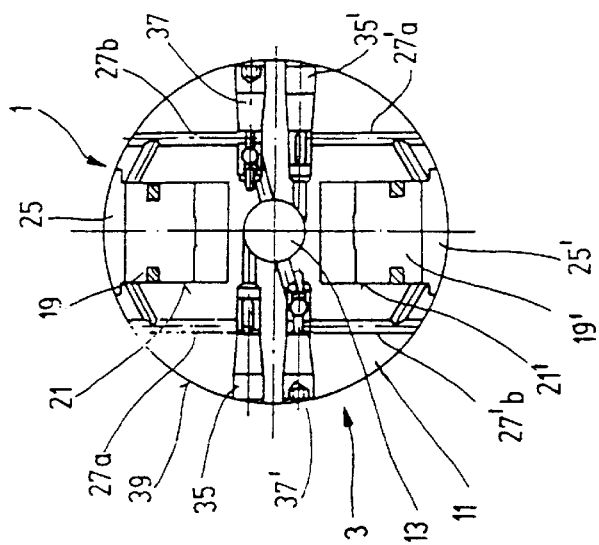
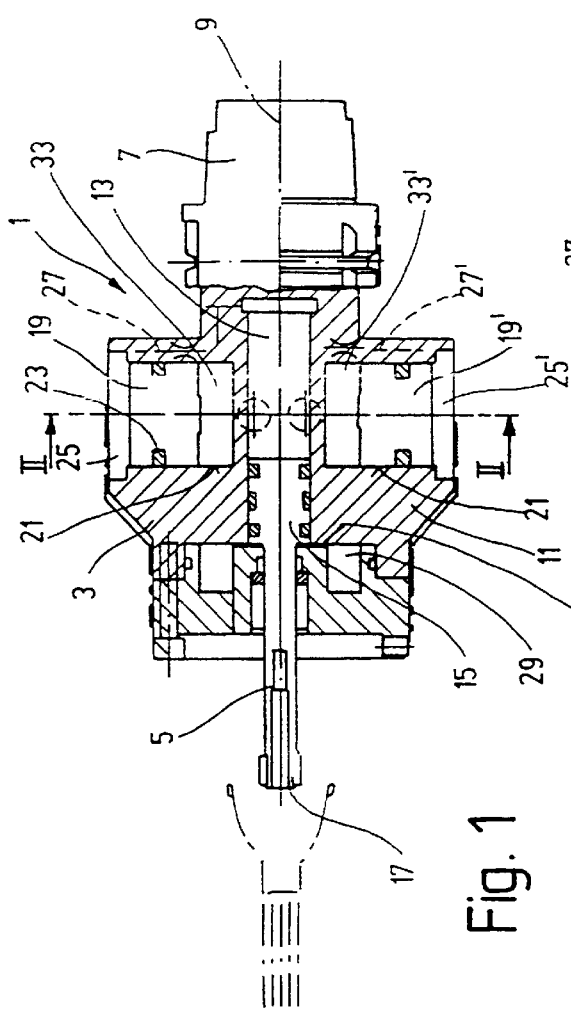
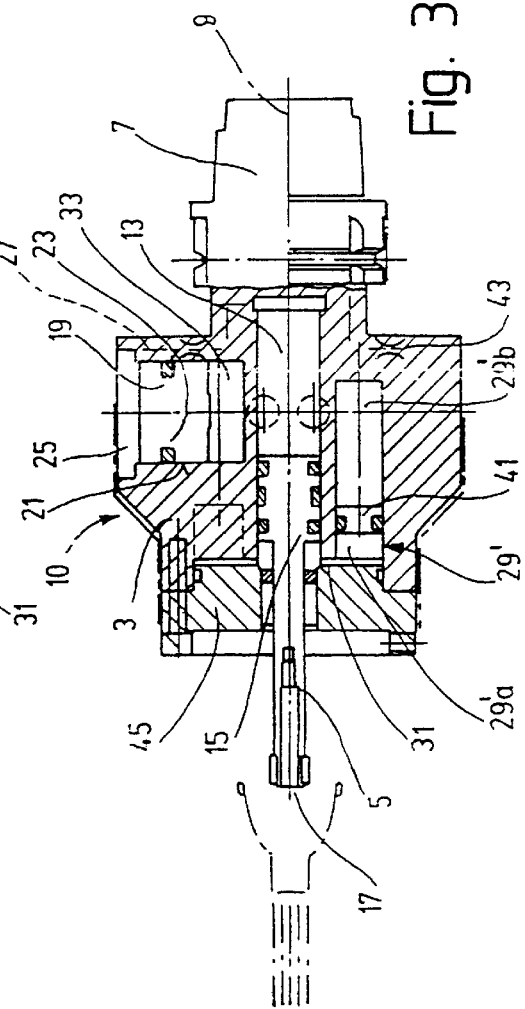

TOOL FOR MACHINING DRILL HOLE SURFACES

BACKGROUND OF THE INVENTION

1. Field of Invention

The invention relates to a tool for the machining of workpiece surfaces, especially of drilled-hole surfaces, having at least two parts which are displaceable relative to each other.

2. Description of the Related Art

Tools of the type referred to here are known. They are referred to as feedout or escape control tools. The relative movement of the tool parts can be brought about in various ways, for example by a control rod, an integral electric motor with or without gears, or with the aid of the lubricant or coolant. In conventional tools, the lubricant or coolant moves within a closed circuit, meaning that it is repeatedly used. In such cases it is impossible to exclude the possibility of impurities in the coolant passing into the tool and impairing the function of the tool and/or the implementation of the relative movement of the two parts thereof. Tools having a control rod or integral electric motors are elaborate in construction and large, and therefore expensive.

SUMMARY OF THE INVENTION

It is therefore an object of the invention to provide a tool of the type referred to initially which does not exhibit these disadvantages, in other words, is of simple construction and functionally reliable.

To achieve this object, a tool is proposed in which it is possible, in the machining of drilled-hole surfaces, to use a fixed tool which is introduced into a drilled hole in a rotating workpiece. In the tool proposed here, it is assumed that the tool for the machining of the drilled-hole surface can be caused to rotate. The tool is characterized in that at least one control member is provided which is displaceable substantially perpendicularly to the axis of rotation of the tool and is displaceable on rotation of the tool because of the centrifugal forces. It is possible, in this arrangement, for the control member to be displaced exactly radially, in other words, perpendicularly to the axis of rotation. However, it is sufficient if at least one movement component of the control member acts substantially perpendicularly to the axis of rotation of the tool. As a result of the displacement of the control member, a relative movement of one tool part relative to the other is effected—preferably from a threshold speed of rotation that can be preset. It is thus apparent that the relative movement of the two tool parts can be effected solely on the basis of the centrifugal forces arising during rotation of the tool. The tool proposed here is therefore very simple and fault-free in its construction, and can also be produced cost-effectively.

A preferred embodiment of the tool is one which comprises a spring member which interacts with the control member. The spring member is designed such that a predetermined restoring force is exerted on the control member. If, therefore, the speed of rotation falls below the presetable threshold, the relative movement of the tool part relative to the other occurs in the opposite direction.

In another preferred embodiment of the tool, the control member interacts with a control medium and causes a flow of this medium in the event of a displacement within the tool. A hydraulic resistance is provided in the flow path of this medium, with the aid of which a uniform flow can be instituted. Influencing the flow of the control medium makes it possible to ensure a uniform movement of the control member.

Preference is also given to an example of the tool wherein the control member directly effects a displacement of one tool part relative to the other. The resulting construction here is particularly simple and very immune to faults.

Another example of the tool is also preferred wherein the control member effects a displacement of the tool part relative to the other via a medium, preferably via a fluid. The control member is thus part of a hydraulic circuit which permits the movement of one tool part relative to the other.

Finally, in a preferred embodiment of the tool, the control member is part of an assembly unit which can be inserted into the tool. It is thus possible to employ assembly units with different characteristics, for example, control members of different sizes or masses, throttles with various hydraulic resistances introduced into the hydraulic circuit and/or spring members with different restoring forces, and so to adapt the tool to different applications. The tool can thus be varied cost-effectively.

Further embodiments and advantages apparent from the description below.

BRIEF DESCRIPTION OF THE DRAWINGS

The invention is explained in detail below with reference to the drawings, in which:

FIG. 1 shows a longitudinal section through a first embodiment of a tool;

FIG. 2 shows a cross section through the tool shown in FIG. 1 along the line II—II;

FIG. 3 shows a longitudinal section through another embodiment of a tool;

DETAILED DESCRIPTION OF THE PREFERRED EMBODIMENTS

Figure 4:
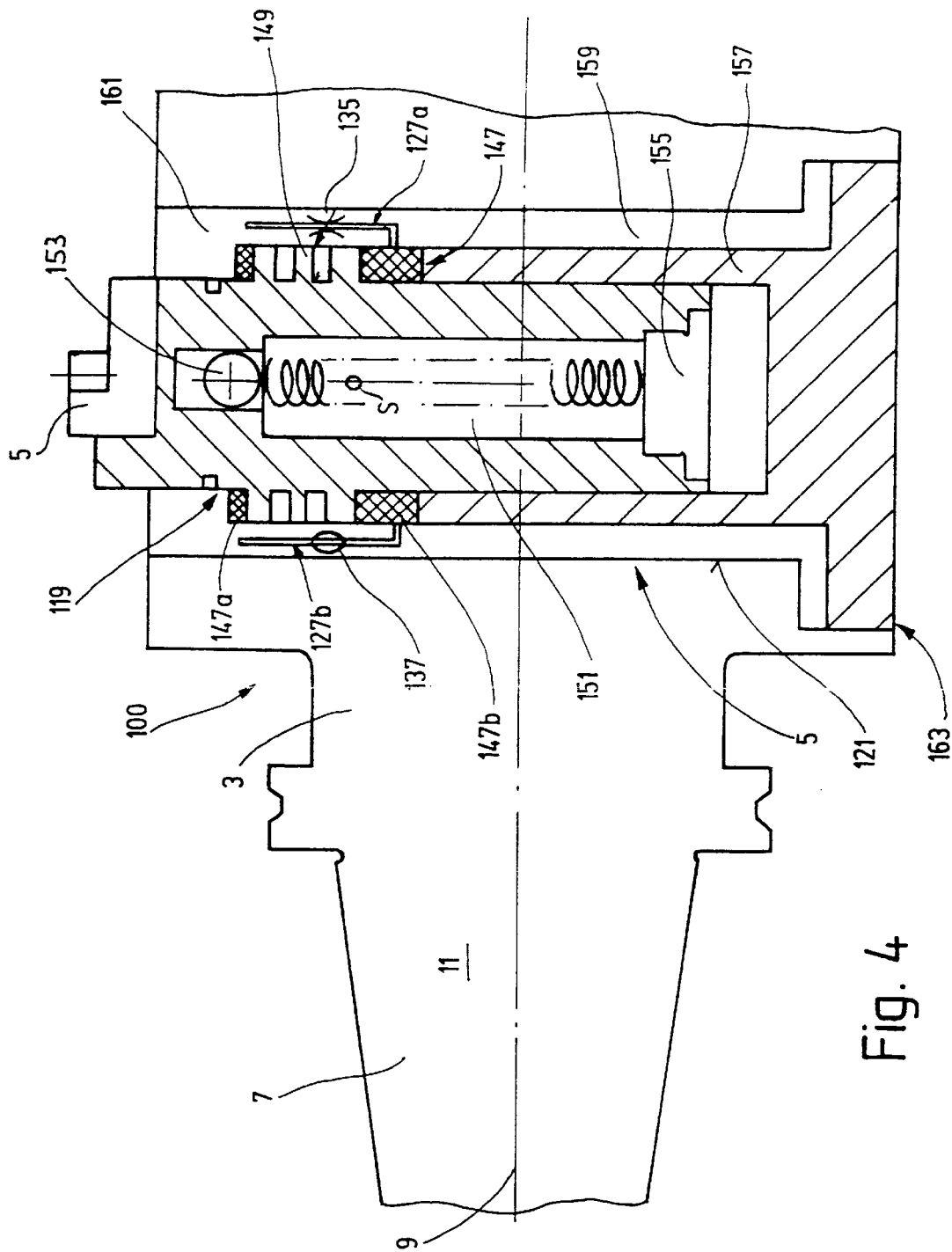
FIGS. 4 and 5 show a partial view of two further embodiments of a tool viewed along longitudinal section.

The tool 1 shown in FIG. 1 comprises two specifically a first tool part 3 and a second tool part 5 displaceably arranged in the interior of this tool. The first tool part is provided here by way of example with cone 7 designed, for example, as a hollow-stemmed cone which serves to secure the tool 1, for example, in a machine tool or in an adapter or connecting piece. The tool 1 is caused to rotate in order to machine a workpiece surface or a drilled-hole surface. The axis of rotation 9 is shown in broken lines. Provided in the base body 11 of the first tool part 3 is a first recess 13, extending, for example, concentrically to the axis of rotation 9, in which the second tool part 5 is displaceably accommodated. In the example embodiment shown here, the relative movement of the second tool part 5 relative to the first tool part 3 extends substantially parallel to the axis of rotation 9.

The second tool part 5 possesses a piston device 15 at one of its ends, which—optionally with the use of a sealing device—bears sealingly on the interior surface of the recess 13 and can be displaced within the recess. By a movement of the piston device, the second tool part 5 is displaced, performing a translational movement. In FIG. 1, the second tool part 5 or the piston device 15 is shown as being displaced fully to the left, so that the second tool part 5 is in an extended position. The length of the recess 13 is selected so that, in the event of an opposite movement of the second tool part 5 relative to the first tool part 3, i.e., to the right in FIG. 1, the exposed end 17 of the second tool part 5 can be introduced to a greater or lesser extent into the base body 11 so that it no longer projects as far beyond the outer contour of the first tool part 3. The extent to which the second tool part 5 is inserted into the recess 13 depends merely on the length of the second tool part 5 relative to the length of the recess 13. It is therefore also possible to retract the second tool part 5 completely into the interior of the first tool part 3, so that the exposed end 17 no longer projects beyond the outer contour of the first tool part 3.

At least one body serving as a control member 19 is introduced into the base body 11. For example, two diametrically opposite control members 19 and 19' are provided here. The control members are accommodated in second recesses 21 and 21', which extend perpendicularly to the axis of rotation 9 and have dimensions selected so that the control members 19 and 19', which are of cylindrical design for the sake of example, bear sealingly on the correspondingly cylindrical interior surface of the recesses 21 and 21'. In addition, sealing members 23 and 23', for example O-rings, may be inset into the exterior surface of the control members 19 and 19' to ensure an optimum seal. The control members 19 and 19' are slideably mounted in the recesses 21 and 21'. Because of their weight or mass, the control members 19, 19' are forced outward by centrifugal force during rotation of the tool 1. They therefore slide outward within the recesses 21, 21', until they impact against the lids 25, 25' closing the recesses or against other stop means.

The recesses 21, 21' are filled with a medium, preferably with a fluid, especially a hydraulic oil. In the event of a displacement of the control members 19, 19', the medium is forced out of the region of the recess 21, 21' lying radially outward of the control members 19, 19', via a suitable connecting path 27, 27', indicated only in broken lines in FIG. 1. The connecting path connects the region of the recess 21, 21' lying radially outward of the control members 19, 19' to the recess 13. Hydraulic oil forced out by the control members 19, 19' thus passes into the recess 13. As a result of the super-atmospheric pressure built up by the control members, the piston device 15 and hence the second tool part 5 is displaced. Since the connecting path 27 opens into the section of the recess 13 shown to the right (as seen in FIG. 1) of the piston device 15, the piston device 15 and the second tool part 5 are displaced to the left in the event of a corresponding superatmospheric pressure.

The medium forced out by the control members 19, 19' thus serves as a control medium, which, in the event of a suitable superatmospheric pressure, effects an outward movement of the second tool part 5 relative to the first tool part 3. The control medium is completely enclosed in the interior of the tool 1 and is not, in this case, in communication with other media which are used in the operation of the tool. The control medium is thus separate from coolants and lubricants, so that the function of the control members is not impaired by impurities which may exist in these media. A very high degree of functional reliability is thus achieved.

At least one compensation chamber 29 in fluid connection with the recess 13 is also provided in the base body 11 of the first tool part 3 and is designed, for example, as a continuous annular space or several individual spaces. The fluid connection 31 between the compensation chamber 29 and the recess 13 serves to receive the medium forced out from the section of the recess 13 lying to the left of the piston device 15 in FIG. 1. For example, a gaseous medium can be forced into the compensation chamber 29 when the piston device 15 is moved to the left. More specifically, the medium is forced through the fluid connection 31 into the compensation chamber 29 and becomes compressed there.

The compressed medium thus serves as a spring member which exerts a predeterminable restoring force on the piston device 15 and tends to force the latter to the right, against the outward movement. As a result of the hydraulic coupling of the piston device 15 to the control members 19 and 19', the restoring force of the spring member, in other words, of the gas compressed in the compensation chamber 29, also acts upon the control member 19 and 19'. The restoring force forces the piston device 15 to the right and thus builds up a superatmospheric pressure in the part of the recess 13 lying to the right of the piston device 15. Via the connecting path 27, this pressure is transmitted to the top of the control members 19, 19', so that the control members are forced radially inward towards the axis of rotation 9.

The gas present in the compensation chamber 29 may be under a certain superatmospheric pressure, so that a predetermined restoring force acts on the control member or the control members. In this case, the latter can perform an outward displacement only when a preset threshold speed of rotation of the tool 1 is reached, thus forcing the medium present above the control members 19, 19' via the connecting path 27 into the right-hand region of the recess 13.

The free space 33 or 33' lying below the control members 19, 19' can be filled with a gas which is in connection with the atmospheric pressure via a suitable line and preferably provided with a filter device. It is at least ensured that any superatmospheric pressure prevailing in the region between the axis of rotation 9 and the bottom of the control member 19, 19' is not sufficiently high for the second tool part 5 to move outwardly without rotation of the tool 1.

It is apparent from FIG. 2 that the connecting path 27 possesses two parts 27a and 27'a and 27'b, which are in fluid connection with the radially outward region of the recess 21 or 21' and of the recess 13.

In the example embodiment shown here, the first path 27a or 27'a is provided with a hydraulic resistance, designed as a throttle 35 or 35', and the path 27b, 27'b is provided with a return valve 37 or 37'. As a result of this design, it is possible to influence the flow of the control medium between the recess 21, 21' and the recess 13 in the event of a movement of the control members 19, 19'. Preferably, provision is made for the throttle 35, 35' to act in the event of a flow of the control medium out of the recesses 21, 21' into the recess 13 to thus provide for a uniform flow of media or a uniform outward movement of the second tool part 5 relative to the first tool part 3. Moreover, in the event of a movement in the opposite direction by the return valve which is closed in the former case, a free outflow of the medium from the first recess into the recesses 21, 21' is ensured. This free outflow ensures that the return movement of the second tool part 5 can take place without obstruction and quickly.

In the event of an outward movement of the second tool part 5, as stated above, the piston device 15 is displaced by the pressure built up in the control medium or in the right-hand part of the recess 13, so that the medium present to the left of the piston device 15 is forced into the compensation chamber 29. Here, as a result of the compression of the gaseous medium, a rising superatmospheric pressure or an increasing restoring force occurs. Nevertheless, a uniform outward movement of the second tool part 5 occurs because, in the event of a radial outward movement of the control members 19 and 19', increasing centrifugal forces are built up as a result of the increasing distance from the axis of rotation 9. As a result of the increasingly stronger forces which force the control members 19 and 19' outward, the pressure above the control members 19, 19' in the recesses 21, 21' and thus in the recess 13 also increases, which in turn results in an increased force in the direction of outward movement of the tool part 5.

FIG. 2 shows that the connecting path 27 or the connecting paths 27a, 27b, 27'a, 27'b can be produced by means of holes drilled in the base body 11 of the first tool part 3, and that the throttle 35, 35' and return valves 37, 37' are also introduced into corresponding drilled holes which intersect the drilled holes of the connecting paths. The method of production of the connecting path 27 is known in the art, so there is no need to provide further details of it here. All that is essential is that the upper or radially outward region of the recesses 21 and 21' is in fluid connection with the recess 13, so that, in the event of inward and outward movement of the control members 19, 19', the control medium can flow on the one hand from the recesses 21 and 21' to the recess 13 and on the other hand in the reverse direction.

In the embodiment shown here, the throttles 35, 35' and return valves 37, 37' are accommodated in drilled holes which intersect the circumferential surface 39 of the tool 1 or of the tool part 3. This means that these built-in parts are accessible from the outside thereof. It is also possible to design the throttles in a variable manner such that the amount of hydraulic resistance can be set. It is also conceivable to design the return valves so that they open and close at different pressure values. It is thus possible to adapt the tool 1 to various applications.

FIG. 3 shows a modified embodiment of a tool 10, which is fundamentally identical in construction to that shown in FIG. 1. The same parts are provided with the same reference numerals, so that to this extent reference can be made to the description of FIG. 1.

The only difference in construction concerns the compensation chamber 29'. The longitudinal section through the tool 10 (FIG. 3)is taken in such a manner the portion below the axis of rotation 9 lies in a different plane from that above the axis of rotation. Nevertheless, it must be emphasized here that two mutually opposite control members 19 and 19' are also present in the tool 10, as was explained with reference to FIG. 1. The compensation chamber 29' is here provided offset relative to the plane in which the control members 19 and 19' lie, but the compensation chamber 29' in this case has two sections, one section 29' and one section 29'b. One of the sections, in this case the left-hand section 29'a, is connected via a fluid connection 31 to a region of the recess 13 which is arranged to the left of the piston device 15. If therefore the piston device 15 or the second tool part 5 is displaced to the left by a superatmospheric pressure in the right-hand part of the recess 13 based on centrifugal forces, the piston device 15 forces the medium to its left into the left-hand section 29'a of the compensation chamber 29' via the fluid connection 31. Provision may also be made here for a gaseous medium—to act as a spring member—to be present in the left-hand section 29'a. However, preference is given to embodiments in which a fluid, for example hydraulic oil, is provided in the left-hand section 29'a, as this makes it easier to control sealing problems with the piston device 15 than in a case with a gaseous medium. In order to permit movement of the piston device 15 toward the left, in such a design in which a fluid is used, a gas volume acting as a spring member is provided in the right-hand section 29'b of the compensation chamber, and, in the event of a movement of the piston device 15 toward the left, is compressed by the fluid forced into the compensation chamber 29'. The left-hand section 29'a is separated from the right-hand section 29'b by a piston 41. This may also form part of a conventional gas pressure spring which comprises a gas volume which is compressed by the fluid forced out by the piston device 15. The compensation chamber 29' is of cylindrical design in this case. Its medium axis 43 extends substantially parallel to the axis of rotation 9. The tool 10—like the tool 1—can be provided with a lid 45 which is removable, and thus allows replacement of the gas pressure spring.

The example embodiment shown in FIG. 3 is characterized in that the piston device 15 can be subjected on both sides to the action of a liquid medium, especially hydraulic oil, the control medium present to the right of the piston device interacting via the connecting path 27 with the recesses 21, 21' and hence with the control members 19, 19', while the oil present to the left of the piston device 15 interacts with a spring member, for example, a gas pressure spring, which exerts a restoring force on the piston device 15 and hence on the control members 19, 19'.

FIG. 4 shows a part of a further example of a tool 100, having a first tool part 3 and a second tool part 5 displaceable relative to the latter. The tool 100 possesses a cone 7 which, as explained with reference to FIG. 1, serves to secure the tool and to drive it.

The second tool part 5 is displaceable, in the event of rotation of the first tool part 3, in a substantially radial direction, in other words perpendicular to the axis of rotation 9. At least a partial component of the movement vector of the tool part extends in the radial direction. This tool part can be used, for example, for forming grooves in drilled-hole surfaces and also for facing.

The tool 100 possesses a control member 119 which is movably mounted in a recess 121 within the tool 100 extending perpendicularly to the axis of rotation 9. IN the view shown in FIG. 4, the control member 119 is in its radially outermost, in other words extended, position.

The control member 119 interacts with a medium, also described as a control medium, in this case with a hydraulic oil. This is contained in a control member 147 which comprises two mutually separate sections 147a and 147b. The control chamber surrounds the control member 119 in an annular manner. It is divided into the two sections 147a and 147b by an annular shoulder 149 extending from the control member 119. The sections 147a, 147b are in hydraulic connection with each other. A connecting path 127 between the two sections 147a and 147b has a first part 127a, in which a throttle 135 acting as a hydraulic resistor is provided, and also a second part 127b, in which a return valve 137 is provided. The control chamber 147 is so designed that, in the event of a radially outward movement of the control member 119, the control medium is forced out of the radially outward section 147a of the control chamber 147 via the connecting path 127 into the radially inward section 147b. The flow of the control medium is influenced by the throttle 135 and by the return valve 137 in such a manner that a radial outward movement of the control member 119 is braked by the action of the throttle and so evened out. An opposing inward movement of the control member 119 can take place without the resistance of the throttle, since in this case the return valve 137 opens and the return of the control medium from the section 147b to the section 147a of the control chamber 147 is practically unobstructed.

The control member 119 interacts with a spring member 151 exerting a restoring force on the control member 119 and bearing at one end on an abutment 153 which is fixed relative to the control member 119 and at the other end on an abutment which is formed by a closing lid 155 of the control member 119. In this case the spring member 151 is accommodated in the interior of the control member 119. In FIG. 4, merely by way of example, the spring member 151 is shown as a helical spring; alternatively, a conventional gas pressure spring can be used as the spring member. It effects a restoring force which counteracts the outward movement of the control member 119 and forces it toward its retracted position. As a result of the restoring force of the spring member 151, the control medium, during a return movement of the control member 119, is conveyed from the section 147b via the return valve 137 into the section 147a of the control chamber 147.

In the embodiment shown in FIG. 4, the control member 119 extends beyond the axis of rotation 9 of the tool 100. It is, however, ensured that the center of gravity 5 of the control member 119, indicated here, is arranged at a distance from the axis of rotation 9, in this case above this axis of rotation. If, then, the tool 100 is caused to rotate, centrifugal forces act on the control member 119 and eventually effect a radially outward movement of the control member 119 counter to the action of the spring member 115.

The control member 119 is surrounded by an inner sleeve 157, which in this case forms the lower limit of the control chamber 147 and is surrounded by an outer second sleeve 159 which forms the outer limit of the control chamber 147. In FIG. 4, a closure ring 161 adjoins the outer sleeve 159 at the top, limits the control chamber 147 at the top and may also be part of the sleeve 159. In the example of the embodiment shown here, the connecting path 127 is in the form of a channel in the outer sleeve 159. It is, however, entirely possible for the connecting path 127 and the return valve and the throttle to be accommodated in the interior or in the base body of the control member 119. This has the advantage that a very compact structural form can be achieved.

The closure ring 161 lies sealingly on the control member 119 and is so designed for movement of the control member 119 relative to the closure ring and relative to the outer sleeve 159 to be possible. The control member 119 is, moreover, mounted to slide relative to the inner sleeve 157.

The sleeves and the closure ring are so designed that they receive the control member 119 and so form an assembly unit 163 which can be inserted as a whole into the base body 11 of the tool 100. In this manner, the assembly unit is easy to replace. Such an assembly unit 163 can be inserted as a fully functional, separate insert into existing tools, to provide a tool part actuated by centrifugal force.

Moreover, it is entirely possible to design the assembly unit 163 or the control member 119 to be so small that—unlike as shown in FIG. 4—it does not extend beyond the axis of rotation 9.

In the embodiment shown here, the second tool part 5 is provided on the radially outward region of the control member 119. This means that the second tool part 5 is directly affixed to the control member 119.

As a result of the coupling of the second tool part 5 to the control member 119, it is possible to displace the second tool part 5 relative to the first tool part 3. The displacement or relative movement of the two tool parts takes place as a function of the speed of rotation of the tool 100 and the centrifugal forces acting on the control member 119, the flow of the control medium taking place in the connecting path 127 during the displacement of the control member 119 being influenced by the throttle 135 and by the return valve 137, which results in the reaction to the relative movement of the second tool part 5. This, as a result of the action of the throttle 135, executes a defined outward movement, preferably a uniform, slow relative movement. The inward movement taking place when the speed of rotation of the tool is reduced can take place quickly under the action of the spring member 151 and because of the return valve 137.

Figure 5:
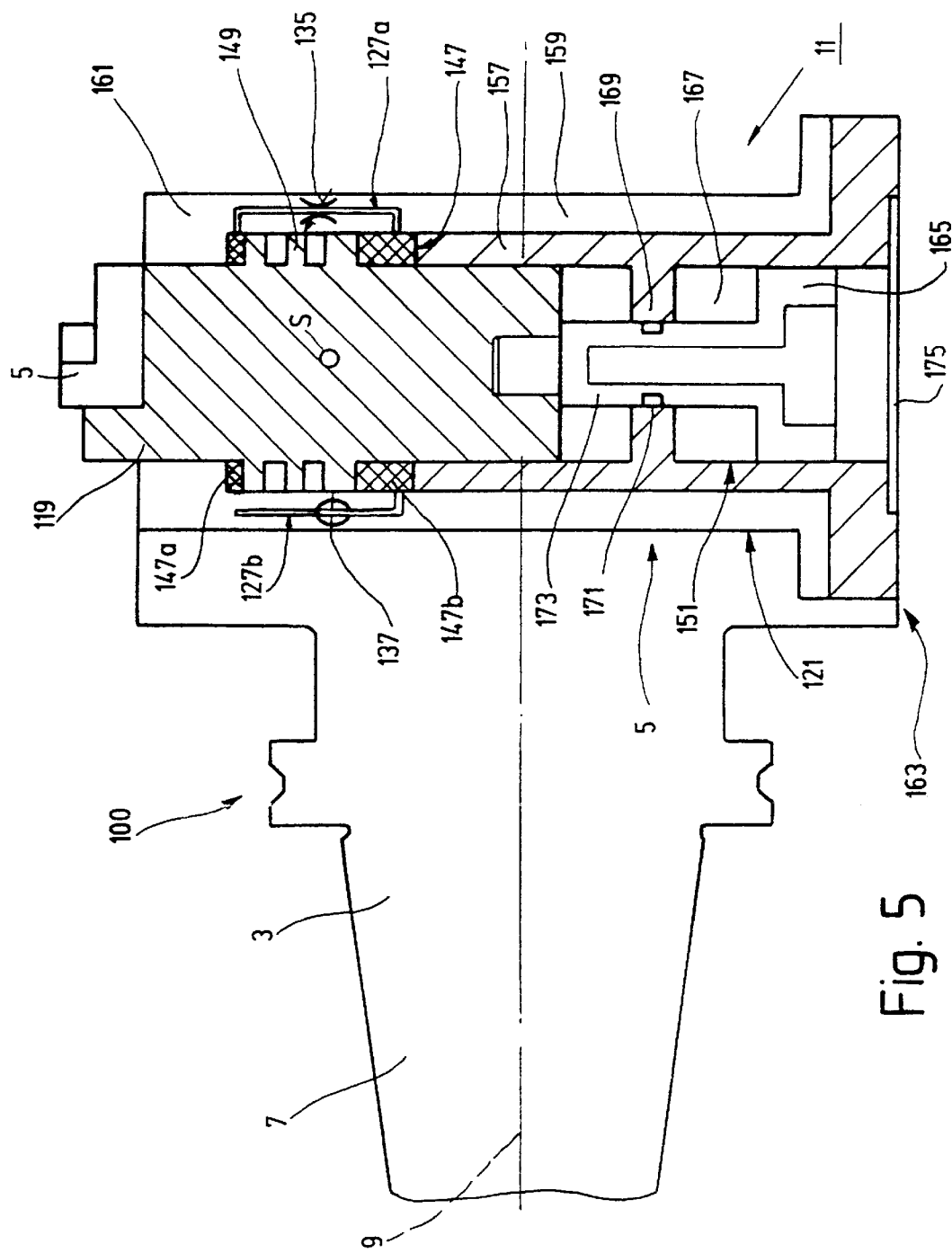

FIG. 5, in turn, shows a part of a tool 100 which is substantially constructed as shown in FIG. 4. Identical parts are therefore provided with identical reference numbers. To this extend, reference is also made to the description of FIG. 4.

The tool 100 possesses a first tool part 3 and a second tool part 5, which again is fixedly connected to a control member 119. The control member moves outward in the course of rotation of the tool 1—preferably upon reaching a particular threshold speed of rotation—as a result of which a control medium, preferably hydraulic oil, is conveyed from a first section 147a via a connecting path 127 to a second section 147b of a control chamber 147. If the speed of rotation falls below the threshold, the control member 119 is displaced back by a spring member 151' or moved back toward the axis of rotation 9.

In the illustration according to FIG. 5, the control member 119 and therefore the second tool part 5 is in its radially outward, in other words extended, position.

The spring member 151 here has a piston 165 which is fixed to the end of the control member 119 opposite the second tool part 5 and builds up a restoring force counteracting the centrifugal force. To do this, the piston interacts with a gas volume 167 which is enclosed between the piston and a closure wall 169, which extends from the first sleeve 157, is arranged between the piston 165 and the control member 119 and, in a suitable manner, for example via a sealing device 171, ensures a pressure-tight closure of the gas volume 167. The compressed gas volume 167 forces the piston 165 away from the axis of rotation 9. Since the piston 165 is connected via a connecting member 173 to the control member 119, the piston 165 draws the control member 119 in the same direction, so that the second tool part 5 on the control member 119 is moved toward the axis of rotation 9. The spring member 151 thus generates a restoring force which counteracts the centrifugal force arising during a rotation of the tool 100. The restoring force is selected so that, upon reaching a particular threshold speed of rotation, the centrifugal force acting on the control member 119 is greater than the restoring force, so that a radially outward displacement takes place of the center of gravity S of the control member 119, located a distance from the axis of rotation 9. Thus the second tool part 5, also fixedly connected to the control member 119, is radially displaced relative to the first tool part 3.

Again, in the embodiment shown in FIG. 5, sleeves 157 and 159 are provided which surround the control member 119 and which, together with a closure ring 161, form an assembly unit 163 which can be replaced as necessary. It is furthermore possible to provide assembly units with hydraulic resistors or throttles 135 of different designs in order to influence the movement, especially the outward movement, of the second tool part 5. It is also possible to employ control members 119 of various masses so that the outward-acting forces during a rotation of the tool 100 can be adjusted to various applications of the tool. Moreover, the assembly unit 163 can be designed to be so small that it does not extend beyond the axis of rotation 9.

In the embodiment shown in FIG. 5, the connecting path 127 with the parts 127a and 127b is accommodated together with the return valve 137 and the throttle 135 in the sleeve 159. However, here again—as explained with reference to FIG. 4—a displacement into the base body of the control member 119 is possible, so that a very compact structural form or assembly unit 163 can be obtained.

It becomes apparent from the illustration in FIG. 5 that the spring member 151 can be embodied as a gas pressure spring which comprises a gas volume 167 under pressure. The gas pressure spring is arranged below a removable lid 175, meaning that the gas pressure spring is ultimately accessible even in the installed state of the assembly unit 163. It is therefore possible, using suitable, known valve devices, to set the pressure of the gas volume 167 and, if appropriate, to replenish gas in order to increase the desired pressure.

In the light of the foregoing, it becomes readily apparent that, in the type of tool explained with reference to FIGS. 1 to 3, utilizing the centrifugal forces from the rotation of the tool, an axial displacement or relative movement of the two tool parts 3 and 5 takes place substantially toward the axis of rotation 9. By contrast, in the tools 100 shown in FIGS. 4 and 5, provision is made for a radial displacement of the second tool part 5 relative to the first tool part 3 as a result of the centrifugal forces arising during rotation of the tool.

Considering FIGS. 1 to 5, it is readily apparent that, within a single tool, both an axial displacement and a radial movement of the tool parts relative to one another can be achieved. It is, moreover, conceivable to exploit the radial displacement of a control member which is fixed to a tool part (see FIGS. 4 and 5) to displace a further tool part in the axial direction. Thus, for example, it is possible to connect the radially outward section 147a of the control chamber via a hydraulic connecting path to a recess 13, as was explained with reference to FIGS. 1 to 3. If, in such a structural form, a control medium is forced out of the radially outward section 147a during the outward movement of the radially movable control member 119, the control medium passes via the connecting path into the recess 13 and thus effects an axial displacement of the second tool part, which was explained with reference to FIGS. 1 to 3.

The axial displacement of the tool part can be determined by the volume displaced by the control member, e.g., by the difference between the external diameter of the annular shoulder 149 and the external diameter of the control member 119 and by the diameter of the recess 13. If a large volume of the control medium is displaced by the control member and the diameter of the recess 13 is relatively small, a relatively large axial displacement of the tool part 5 of the tool 1 or 10, explained with reference to FIGS. 1 to 3, takes place.

In the operation of the tool, having two tool parts, as described hitherto, it becomes apparent that, in addition to an axial displacement, which was explained with reference to FIGS. 1 to 3, a displacement of a tool part at any desired angle to the axis of rotation 9 of the tool 1 or 10 is simultaneously possible. It is also entirely possible, with the aid of the control medium displaced by a control member, to extend a plurality of tool parts in various directions.

In all cases, it is ensured that the relative movement of the tool parts (s) is one direction, with the aid of a hydraulic resistor or a throttle, is influenced so that a defined advancing movement which is uniform as possible is generated, while the contrary return movement can take place relatively quickly because of a return valve and/or a suitable spring member generating appropriate restoring forces.

During use of the tool, it is immaterial whether the control member directly effects a displacement of the second tool part, as explained with reference to FIGS. 4 and 5, or whether—as explained with reference to FIGS. 1 to 3—a control medium is interposed which transmits to a piston device the movement of the control member based on the centrifugal force, the piston device producing a relative movement of the second, centrifugal force-actuated tool part 5.

The restoring forces may act on the control member directly or be transmitted via a mechanical or, as explained with reference to FIGS. 1 to 3, hydraulic coupling by a piston device to the control member.

By selecting the mass of the control member or by arranging its center of gravity relative to the axis of rotation of a tool, the centrifugal forces arising during a rotation of the tool can be set so that the forces applied by the control member can be predetermined in order to displace a part of a tool. Since the control member interacts with a spring member which directly or indirectly exerts a force on the control member, a threshold speed of rotation can be defined, which when exceeded, initiates a relative movement of the control member and hence of the associated tool part. The threshold speed of rotation is, after all, relatively simple to predetermine. It is even possible to vary this with existing tools, for example, by using gas pressure springs whose pressure can be set externally of the tool.

It is common to all the disclosed examples that the control member can be displaced on the basis of centrifugal forces alone, which results in a relative movement of the two tool parts 3 and 5 based on the centrifugal forces or a centrifugal force-actuation of the tool part 5. The design of the tools is thus very simple and hence cost-effective to produce.

The movement of the tool parts relative to each other can be exploited in a variety of applications. It is not necessary, therefore, for both tool parts to be used for machining. It is also conceivable for one of the tool parts to be used only to guide the tool relative to the workpiece to be machined or to support the second tool part.

Figure 6:
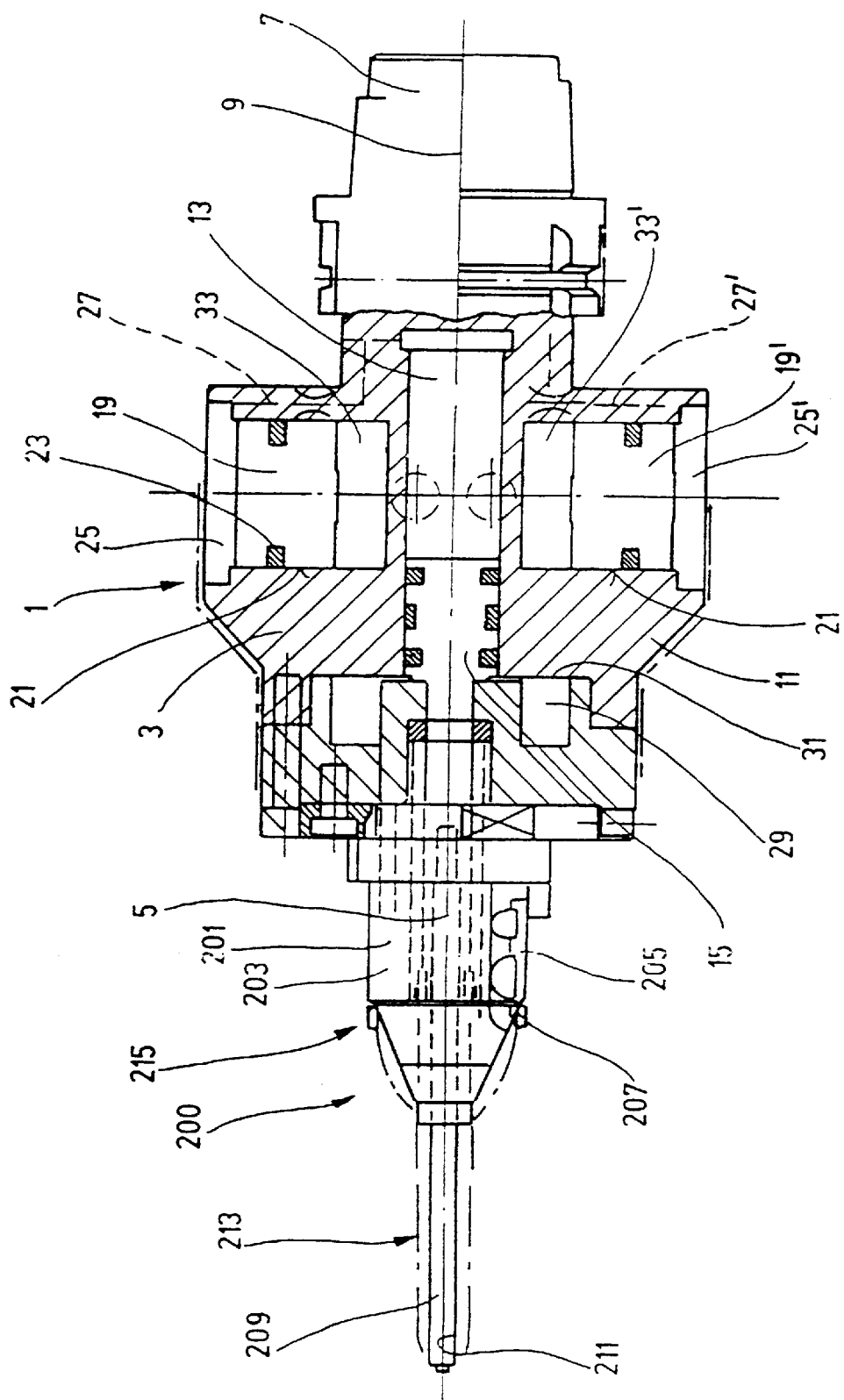
FIG. 6 shows a tool for the machining of valve seats and valve guides in an engine block of an internal combustion engine.

The tool has proven particularly useful in connection with the machining of valve seats and valve guides in the engine block of an internal combustion engine. Such a tool is shown in FIG. 6. FIG. 6 shows the tool 1, which has been explained in detail with reference to FIGS. 1 and 2. Identical parts are therefore provided with identical reference numbers. To this extent, reference is made to the description of FIGS. 1 and 2. Attached to the tool part 3 of the tool 1 is a special tool 200 which is known in principle. In what follows, therefore, details are given only of the essential parts and functions. The special tool has a first tool section 201, fixedly connected to the tool part 3, which can be caused to rotate with the tool part 3 and is provided on it circumferential surface 203 with at least one cutting plate 205 which has a leftward-pointing blade 207 which extends at an angle to the axis of rotation 9 and is used for machining the valve seat.

Provided within the tool section 201 is a tool section 209 mounted to be displaceable in the direction of the axis of rotation 9 and representing a known valve-cutting tool or a reamer. The tool section 209 is coupled to the tool part 5, shown here in broken lines, in a manner such that, when the tool part 5 is displaced, a displacement of the tool section 209 takes place. This, in this case, has on its circumferential surface, a knife plate 211 which serves to machine the valve guide. It is possible to provide the tool sections 201 and 209 with one or more guide strips in order to guarantee the quality and dimensional conformity of the machined surfaces.

In FIG. 6, the region of the valve guide 213 and of the valve seat 215 is indicated in broken lines.

In accordance with the illustration in FIG. 1, in which the tool part 5 is shown in its extended position relative to the tool part 3, the tool section 209 is also extended relative to the tool section 201 of the special tool 200.

It is readily apparent from the explanatory notes on FIG. 6 that the special tool 200 described in this case can easily be combined with a tool 10, which is described in detail in connection with FIG. 3.

The manner of operation of the special tool 200, which serves to machine valve seats and guides in an engine block of an internal combustion engine, is known in principle. Regarding the manner of operation of this special tool and the tool 1 or 10 shown with reference to FIGS. 1 to 3, only the following is therefore reproduced here:

During the machining of the valve seat, the tool 1, and hence the special tool 200, rotates at a first speed of rotation which may be, for example, 1000 rpm. The centrifugal forces acting at this speed of rotation on the control members 19 and 19' explained in detail with reference to FIGS. 1 to 3 are not sufficient to build up such a high pressure in the recess 13 that the piston device 15 is displaced to the left. The restoring forces acting on the piston device 15 are thus so great that the second tool part 5, and hence the tool section 209, is in its retracted position. The piston 15 is thus—contrary to the illustration in FIGS. 1 and 3—displaced entirely to the right, so that the second tool part 5 and the tool section 209 are arranged in the retracted position.

After completion of the machining of the valve seat 215, the tool 1 is retracted somewhat so that the fully machined valve seat is no longer in contact with the first tool section 201 or the blade 207. Now, the speed of rotation of the tool is greatly increased, for example to 4000 to 5000 rpm. At this speed of rotation, such high centrifugal forces act on the control members 19, 19' that the piston device 15 is displaced to the left against the pressure prevailing in the compensation chamber 29 or 29'. As a result, the second tool part 5, and hence the tool section 209, performs a movement relative to the first tool part and moves into its extended position. As a result of the relative movement of the second tool part 5, the valve-cutting tool or the tool section 209 is moved into the drilled hole serving as the valve guide, the drilled-hole surface being machined for the valve guide 213. As a result of the throttles described above with reference to FIGS. 1 to 3, it is ensured that the advancing movement takes place uniformly. As soon as the valve guide has been fully machined, the speed of rotation of the tool is greatly reduced, so that the piston device 15 and hence the control members 19 and 19' are retracted by the restoring forces, so that the second tool part 5 or the tool section 209 is likewise retracted and moved out from the valve guide. As a result of the use of the return valves, the return movement is much faster than the advancing movement during the machining of the valve guide surface.

From the explanations regarding the special tool 200, it becomes readily apparent that the tool 1 or 10 described with reference to FIGS. 1 to 3 can be combined with conventional tools. It is also important that an axial displacement of a tool part relative to another tool part can be achieved in a simple manner, centrifugal forces only being used to generate the relative movement. No additional control members, for example, control rods or motors incorporated in the tool, are needed in order to bring about the relative movement. The tool is therefore very low-wearing and has a low susceptibility to faults.

As a result of the combination of various movement paths in the axial and radial directions, widely differing tools can be produced, control members also being used that effect both a radial and an axial relative movement. Relative movements at any desired angles to the axis of rotation of the tools are also achievable.

From the function of the control members, it is readily apparent that the number of control members can be adapted to the application. In order to simplify the balancing of the tools, three control members are preferably used, which are inserted into the base body of the tool at a uniform circumferential distance part. However, as is apparent from FIGS. 1 to 3, it is also readily possible to effect movement of two tool parts relative to each other with two control members or, as shown with reference to FIGS. 4 and 5, merely to use one control member for such relative movement.

What is claimed is:

1. A tool for the machining of workpiece surfaces, the tool having at least two tool parts which are displaceable relative to one another, the tool for the machining of the workpiece surfaces being rotatable, wherein at least one control member is provided which is displaceable relative to the tool substantially perpendicularly to the axis of rotation of the tool, wherein the control member effects a movement of one tool part relative to the other due to a centrifugal force generated when the tool is rotated at least at a preset threshold speed of rotation, the control member interacting with a spring member which comprises a gas pressure spring, the gas pressure spring being adjustable to provide a desired restoring force to counteract the centrifugal force on the control member.

2. The tool as claimed in claim 1, wherein the control member interacts with a control medium and causes a flow of the control medium when the control member is displaced within the tool.

3. The tool as claimed in claim 2, wherein a hydraulic resistor is provided in a flow path of the contorl medium.

4. The tool as claimed in claim 2, wherein a return valve is provided in a flow path of the control medium.

5. The tool as claimed in claim 1, wherein the spring member acts on the control member directly or via a medium.

6. The tool as claimed in claim 1, wherein three control members are provided.

7. The tool as claimed in claim 1, wherein the control member directly effects a displacement of one tool part relative to the other.

8. The tool as claimed in claim 1, wherein the control member effects a displacement of one tool part relative to the other via a medium.

9. The tool as claimed in claim 1, wherein the control member interacts with a piston device which effects a displacement of one tool part relative to the other.

10. The tool as claimed in claim 9, wherein the piston device is subjected on one side to the action of a control medium.

11. The tool as claimed in claim 10, wherein the piston device interacts on the other side with a spring member counteracting the control medium.

12. The tool as claimed in claim 1, wherein the control member is part of an assembly unit which can be inserted into the tool.

13. The tool as claimed in claim 1, wherein the control member is a body which is displaceable under the action of the generated centrifugal force.

14. The tool as claimed in claim 2, wherein the control medium is an oil.

15. The tool as claimed in claim 3, wherein the hydraulic resistor is a throttle.

16. The tool as claimed in claims 5, wherein the medium is a fluid.

17. The tool as claimed in claim 8, wherein the medium is a fluid.

18. An insert with a tool part and which is removably insertable as a unit into a rotatable tool, said unit comprising a control member which is movable under the action of centrifugal forces to displace the tool part.

* * * * *